(12) United States Patent
Shah et al.

(10) Patent No.: US 8,543,226 B2
(45) Date of Patent: Sep. 24, 2013

(54) ENERGY MANAGEMENT SYSTEM

(75) Inventors: Ashok Deepak Shah, Atlanta, GA (US); David Diehl Roberts, III, Birmingham, AL (US)

(73) Assignee: Cooper Technologies Company, Houston, TX (US)

( * ) Notice: Subject to any disclaimer, the term of this patent is extended or adjusted under 35 U.S.C. 154(b) by 928 days.

(21) Appl. No.: 12/408,499

(22) Filed: Mar. 20, 2009

(65) Prior Publication Data
US 2009/0240380 A1   Sep. 24, 2009

Related U.S. Application Data

(60) Provisional application No. 61/038,211, filed on Mar. 20, 2008.

(51) Int. Cl.
| G05B 11/01 | (2006.01) |
| G05B 13/02 | (2006.01) |
| G05D 23/00 | (2006.01) |
| G06F 17/00 | (2006.01) |

(52) U.S. Cl.
USPC .......... 700/22; 700/19; 700/51; 700/275; 700/295

(58) Field of Classification Search
USPC ......... 700/9, 10, 12, 19, 22, 47, 51, 275–278, 700/295–296; 706/47–48; 726/2
See application file for complete search history.

(56) References Cited

U.S. PATENT DOCUMENTS

| 1,453,936 A | 5/1923 | Gunn |
| 2,733,831 A | 2/1956 | Nehls |
| 4,005,380 A | 1/1977 | Heilmann et al. |
| 4,153,936 A | 5/1979 | Schmitz et al. |
| 4,180,744 A | 12/1979 | Helwig, Jr. |
| 4,228,364 A | 10/1980 | Walden |
| 4,325,223 A | 4/1982 | Cantley |
| 4,347,576 A | 8/1982 | Kensinger et al. |
| 4,370,723 A | 1/1983 | Huffman et al. |
| 4,382,544 A | 5/1983 | Stewart |
| 4,509,585 A | 4/1985 | Carney et al. |
| 4,556,866 A | 12/1985 | Gorecki |

(Continued)

FOREIGN PATENT DOCUMENTS

CN   1464695 A   12/2003

OTHER PUBLICATIONS

The International Search Report and the Written Opinion of the International Searching Authority, or the Declaration dated May 22, 2009 of the co-pending PCT Application, Serial No. PCT/US09/37866 filed Mar. 20, 2009.

(Continued)

*Primary Examiner* — Sean Shechtman
(74) *Attorney, Agent, or Firm* — Hope Baldauff, LLC

(57) ABSTRACT

Feedback is received from a plurality of devices. External data is also received. Statistical patterns of the plurality of devices are determined based on the feedback. A policy is determined based on the statistical patterns, the feedback, and the external data. The policy may include a set of rules dictating the operation of each of the plurality of devices and reducing energy consumption at the plurality of devices. Control data based on the policy is transmitted to the plurality of devices. The control data may be operative to transform the operation of the plurality of devices according to the set of rules.

20 Claims, 6 Drawing Sheets

(56) References Cited

U.S. PATENT DOCUMENTS

| | | | |
|---|---|---|---|
| 4,663,569 A | 5/1987 | Alley et al. |
| 4,695,738 A | 9/1987 | Wilmot |
| 4,804,938 A | 2/1989 | Rouse et al. |
| 4,847,782 A | 7/1989 | Brown, Jr. et al. |
| 4,909,041 A | 3/1990 | Jones |
| 5,248,919 A | 9/1993 | Hanna et al. |
| 5,291,101 A | 3/1994 | Chandrasekaran |
| 5,323,090 A | 6/1994 | Lestician |
| 5,462,225 A | 10/1995 | Massara et al. |
| 5,471,119 A | 11/1995 | Ranganath et al. |
| 5,475,360 A | 12/1995 | Guidette et al. |
| 5,621,662 A | 4/1997 | Humphries et al. |
| 5,635,895 A | 6/1997 | Murr |
| 5,668,446 A | 9/1997 | Baker |
| 5,682,949 A | 11/1997 | Ratcliffe et al. |
| 5,884,205 A | 3/1999 | Elmore et al. |
| 5,905,442 A | 5/1999 | Mosebrook et al. |
| 5,924,486 A | 7/1999 | Ehlers et al. |
| 5,927,598 A | 7/1999 | Broe |
| 5,982,103 A | 11/1999 | Mosebrook et al. |
| 6,016,038 A | 1/2000 | Mueller et al. |
| 6,040,663 A | 3/2000 | Bucks et al. |
| 6,064,695 A | 5/2000 | Raphaeli |
| 6,157,093 A | 12/2000 | Giannopoulos et al. |
| 6,178,362 B1 | 1/2001 | Woolard et al. |
| 6,184,656 B1 | 2/2001 | Karunasiri et al. |
| 6,216,956 B1 | 4/2001 | Ehlers et al. |
| 6,226,600 B1 | 5/2001 | Rodenberg, III et al. |
| 6,278,245 B1 | 8/2001 | Li et al. |
| 6,285,912 B1 | 9/2001 | Ellison et al. |
| 6,292,901 B1 | 9/2001 | Lys et al. |
| 6,304,464 B1 | 10/2001 | Jacobs et al. |
| 6,340,864 B1 | 1/2002 | Wacyk |
| 6,384,545 B1 | 5/2002 | Lau |
| 6,411,046 B1 | 6/2002 | Muthu |
| 6,441,558 B1 | 8/2002 | Muthu et al. |
| 6,441,723 B1 | 8/2002 | Mansfield, Jr. et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 * | 12/2002 | Muthu et al. ............... 315/149 |
| 6,507,158 B1 | 1/2003 | Wang |
| 6,507,159 B2 | 1/2003 | Muthu |
| 6,528,594 B1 | 3/2003 | Bauer et al. |
| 6,548,967 B1 | 4/2003 | Dowling et al. |
| 6,552,495 B1 | 4/2003 | Chang |
| 6,576,881 B2 | 6/2003 | Muthu et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,614,013 B2 | 9/2003 | Pitigoi-Aron et al. |
| 6,614,204 B2 * | 9/2003 | Pellegrino et al. ............ 320/109 |
| 6,621,235 B2 | 9/2003 | Chang |
| 6,630,801 B2 | 10/2003 | Schuurmans |
| 6,639,368 B2 | 10/2003 | Sheoghong |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,777,891 B2 | 8/2004 | Lys et al. |
| 6,785,592 B1 | 8/2004 | Smith et al. |
| 6,813,525 B2 | 11/2004 | Reid et al. |
| 6,822,555 B2 | 11/2004 | Mansfield et al. |
| 6,831,569 B2 | 12/2004 | Wang et al. |
| 6,867,558 B2 | 3/2005 | Gaus, Jr. et al. |
| 6,874,691 B1 | 4/2005 | Hildebrand et al. |
| 6,888,819 B1 | 5/2005 | Mushkin et al. |
| 6,897,624 B2 | 5/2005 | Lys et al. |
| 6,901,521 B2 | 5/2005 | Chauvel et al. |
| 6,907,472 B2 | 6/2005 | Mushkin et al. |
| 6,933,685 B2 | 8/2005 | Gutta et al. |
| 6,937,648 B2 | 8/2005 | Raphaeli |
| 6,975,079 B2 | 12/2005 | Lys et al. |
| 6,982,870 B2 | 1/2006 | Wu et al. |
| 6,998,594 B2 | 2/2006 | Gaines et al. |
| 7,014,336 B1 | 3/2006 | Ducharme et al. |
| 7,038,399 B2 | 5/2006 | Lys et al. |
| 7,071,762 B2 | 7/2006 | Xu et al. |
| 7,113,541 B1 | 9/2006 | Lys et al. |
| 7,139,617 B1 | 11/2006 | Morgan et al. |
| 7,140,752 B2 | 11/2006 | Ashdown |
| 7,161,556 B2 | 1/2007 | Morgan et al. |
| 7,178,941 B2 | 2/2007 | Roberge et al. |
| 7,202,608 B2 | 4/2007 | Robinson et al. |
| 7,202,613 B2 | 4/2007 | Morgan et al. |
| 7,204,622 B2 | 4/2007 | Dowling et al. |
| 7,231,060 B2 | 6/2007 | Dowling et al. |
| 7,233,115 B2 | 6/2007 | Lys |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,256,554 B2 | 8/2007 | Lys |
| 7,262,559 B2 | 8/2007 | Tripathi et al. |
| 7,300,192 B2 | 11/2007 | Mueller et al. |
| 7,319,298 B2 | 1/2008 | Jungwirth et al. |
| 7,339,466 B2 | 3/2008 | Mansfield et al. |
| 7,353,071 B2 | 4/2008 | Blackwell et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,961 B2 | 4/2008 | Zwanenburg |
| 7,387,405 B2 | 6/2008 | Ducharme et al. |
| 7,427,927 B2 | 9/2008 | Borleske et al. |
| 7,456,588 B2 | 11/2008 | Alexandrov |
| 7,703,951 B2 | 4/2010 | Piepgras et al. |
| 7,725,629 B2 | 5/2010 | Sturm et al. |
| 7,766,518 B2 | 8/2010 | Piepgras et al. |
| 7,961,090 B2 | 6/2011 | Hu |
| 8,195,340 B1 * | 6/2012 | Haney et al. ............... 700/295 |
| 2004/0137935 A1 | 7/2004 | Zaroom |
| 2004/0178683 A1 | 9/2004 | Hermetz et al. |
| 2004/0259435 A1 | 12/2004 | Stephan et al. |
| 2005/0097162 A1 | 5/2005 | Budike, Jr. |
| 2005/0099319 A1 | 5/2005 | Hutchison et al. |
| 2005/0289279 A1 | 12/2005 | Fails et al. |
| 2006/0022214 A1 | 2/2006 | Morgan et al. |
| 2006/0142900 A1 * | 6/2006 | Rothman et al. ............... 700/295 |
| 2006/0262544 A1 | 11/2006 | Piepgras et al. |
| 2007/0024213 A1 | 2/2007 | Shteynberg et al. |
| 2007/0131784 A1 | 6/2007 | Garozzo et al. |
| 2007/0145915 A1 | 6/2007 | Roberge et al. |
| 2007/0213879 A1 | 9/2007 | Iwamura |
| 2007/0228999 A1 | 10/2007 | Kit |
| 2007/0229295 A1 | 10/2007 | Curt et al. |
| 2007/0260405 A1 | 11/2007 | McConnell et al. |
| 2008/0052145 A1 * | 2/2008 | Kaplan et al. ............... 705/8 |
| 2008/0281473 A1 * | 11/2008 | Pitt ............... 700/291 |
| 2009/0062967 A1 * | 3/2009 | Kressner et al. ............... 700/286 |
| 2009/0086487 A1 | 4/2009 | Ruud et al. |
| 2009/0237011 A1 | 9/2009 | Shah et al. |

OTHER PUBLICATIONS

International Search Report dated May 27, 2009 in International Application No. PCT/US09/37843.

U.S. Appl. No. 12/408,503, filed Mar. 20, 2009, entitled "Managing SSL Fixtures Over PLC Networks" Inventors: Ashok Deepak Shah and David Diehl Roberts, III.

PCT Patent Application Serial No. PCT/US09/37859, filed Mar. 20, 2009, entitled "Managing SSL Fixtures Over PLC Networks" Inventors: Ashok Deepak Shah and David Diehl Roberts, III.

PCT Patent Application Serial No. PCT/US09/37866, filed Mar. 20, 2009, entitled "Energy Management System" Inventors: Ashok Deepak Shah and David Diehl Roberts, III.

The International Search Report and the Written Opinion of the International Searching Authority, or the Declaration dated Apr. 29, 2009 of the co-pending PCT Application, Serial No. PCT/US09/37859 filed Mar. 20, 2009.

U.S. Official Action dated Dec. 7, 2010 in U.S. Appl. No. 12/408,503.

U.S. Official Action dated Jun. 9, 2011 in U.S. Appl. No. 12/408,503.

U.S. Notice of Allowance dated Oct. 31, 2011 in U.S. Appl. No. 12/408,503.

U.S. Official Action dated Dec. 21, 2011 in U.S. Appl. No. 12/408,463.
U.S. Notice of Allowance dated May 9, 2012 in U.S. Appl. No. 12/408,463.
Chinese Official Action dated Mar. 20, 2012 in Chinese Application No. 200980119568.2.
Datasheet: CY8CPLC10—Powerline Communication Solution Apr. 24, 2008, Cypress Semiconductor Corporation, 11 pages.
DCSK—ASCK Overview, downloaded Mar. 20, 2009 from http://tinyurl.com/aw6hqy, 2 pages.
U.S. Official Action dated Jul. 19, 2012 in U.S. Appl. No. 13/399,268.
U.S. Official Action dated Aug. 31, 2012 in U.S. Appl. No. 13/399,268.
Australian Official Action dated Mar. 13, 2013 in Australian Application No. 2009225460.
U.S. Official Action dated Nov. 23, 2012 in U.S. Appl. No. 13/546,366.
U.S. Notice of Allowance dated Mar. 19, 2013 in U.S. Appl. No. 13/399,268.
Chinese Official Action dated Jan. 17, 2013 in Chinese Application No. 200980119568.2.
Chinese Official Action dated Sep. 10, 2012 in Chinese Application No. 200980119574.8.
Australian Official Action dated Mar. 4, 2013 in Australian Application No. 2009225455.
U.S. Notice of Allowance dated May 16, 2013 in U.S. Appl. No. 13/546,366.
Australian Official Action dated Jul. 1, 2013 in Australian Application No. 2009225446.

* cited by examiner

ENERGY MANAGEMENT SYSTEM

CROSS-REFERENCE TO RELATED APPLICATIONS

This application claims the benefit of U.S. provisional patent application Ser. No. 61/038,211 entitled "INTELLIGENT ILLUMINATION AND ENERGY MANAGEMENT SYSTEM" filed on Mar. 20, 2008, which is expressly incorporated herein by reference. This patent application is also related to and filed with U.S. patent application Ser. No. 12/408,503, now U.S. Pat. No. 8,148,854, entitled "MANAGING SSL FIXTURES OVER PLC NETWORKS," Ser. No. 12/408,464, now U.S. Pat. No. 7,726,974, entitled "A CONDUCTIVE MAGNETIC COUPLING SYSTEM," and Ser. No. 12/408,463, now U.S. Pat. No. 8,324,838, entitled "ILLUMINATION DEVICE AND FIXTURE," each of which was filed on Mar. 20, 2009 and is assigned to the same assignee as this application. The aforementioned patent applications are expressly incorporated herein, in their entirety, by reference.

TECHNICAL FIELD

The present invention relates generally to the field of energy management and, more particularly, to a controlling energy consumption over multiple devices.

BACKGROUND

Conventional energy management techniques utilize electricity meters in order to maximize energy usage. An electricity meter can display energy load for a building or other structure. If a user takes steps to reduce the energy usage, the user may be left to rely solely on the electricity meter in order to determine whether those steps render an energy savings.

One significant drawback with electricity meters is that electricity meters cannot provide feedback regarding the energy savings with respect to certain actions. For example, if the user decreases the thermostat during the winter from seventy-two degrees to sixty-eight degrees, the user has no way of determining the amount of energy savings resulting from decreasing the thermostat. If the user also dims several unused lights, the user has no way of differentiating the energy savings resulting from dimming the lights and energy savings resulting from reducing the thermostat. In this regard, energy management techniques relying on the electricity meter are sub-optimal.

It is with respect to these considerations and others that the disclosure made herein is presented.

SUMMARY

Technologies are described herein for providing an energy management system. The energy management system ("EMS") may include a central controller that is operative to control and monitor a plurality of devices. Each of the devices is operative to provide device-level feedback to the central controller. The central controller may determine control commands based on the feedback and other relevant data.

According to one embodiment, a method is provided herein for controlling energy consumption across multiple devices. Feedback is received from a plurality of devices. External data is also received. Statistical patterns of the plurality of devices are determined based on the feedback. A policy is determined based on the statistical patterns, the feedback, and the external data. The policy may include a set of rules dictating the operation of each of the plurality of devices and reducing energy consumption at the plurality of devices. Control data based on the policy is transmitted to the plurality of devices. The control data may be operative to transform the operation of the plurality of devices according to the set of rules.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

DETAILED DESCRIPTION

The following detailed description is directed to technologies for providing an energy management system. The energy management system provides control, energy management, monitoring, load management, and various other features. Although not so limited, the energy management system may be implemented to manage the operation of an illumination network. The illumination network may utilize solid state lighting ("SSL") technology, such as light emitting diodes ("LEDs"), light emitting capacitors ("LECs"), and light emitting transistors ("LETs"). The illumination network may also utilize incandescent, fluorescent, halogen, high intensity discharge, and other suitable technologies. Although not so limited, embodiments described herein may refer to LEDs. It should be appreciated that other SSL technology, such as LECs and LETs, may be similarly utilized.

According to embodiments, the energy system includes a central controller coupled to multiple devices, such as LEDs, over a network, such as a power line carrier ("PLC") network. The PLC network may include a communication bridge operative to enable communications with other computing devices via Ethernet, wireless, infrared, and the like. The central controller may transmit control data over the network to control the devices. In particular, the devices may be individually controlled through the control data. In addition to receiving and implementing the control data from the central controller, the devices may provide various feedback, such as energy consumption, to the central controller. Each device may provide individualized, device-level feedback to the central controller. Upon receiving the feedback from the devices, the central controller may adjust the control data based on the feedback and other relevant data. In this way, a continuous flow of control data and feedback may be established between the central controller and the devices. This continuous flow of control data and feedback between the central controller and the devices is referred to herein as a feedback loop.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
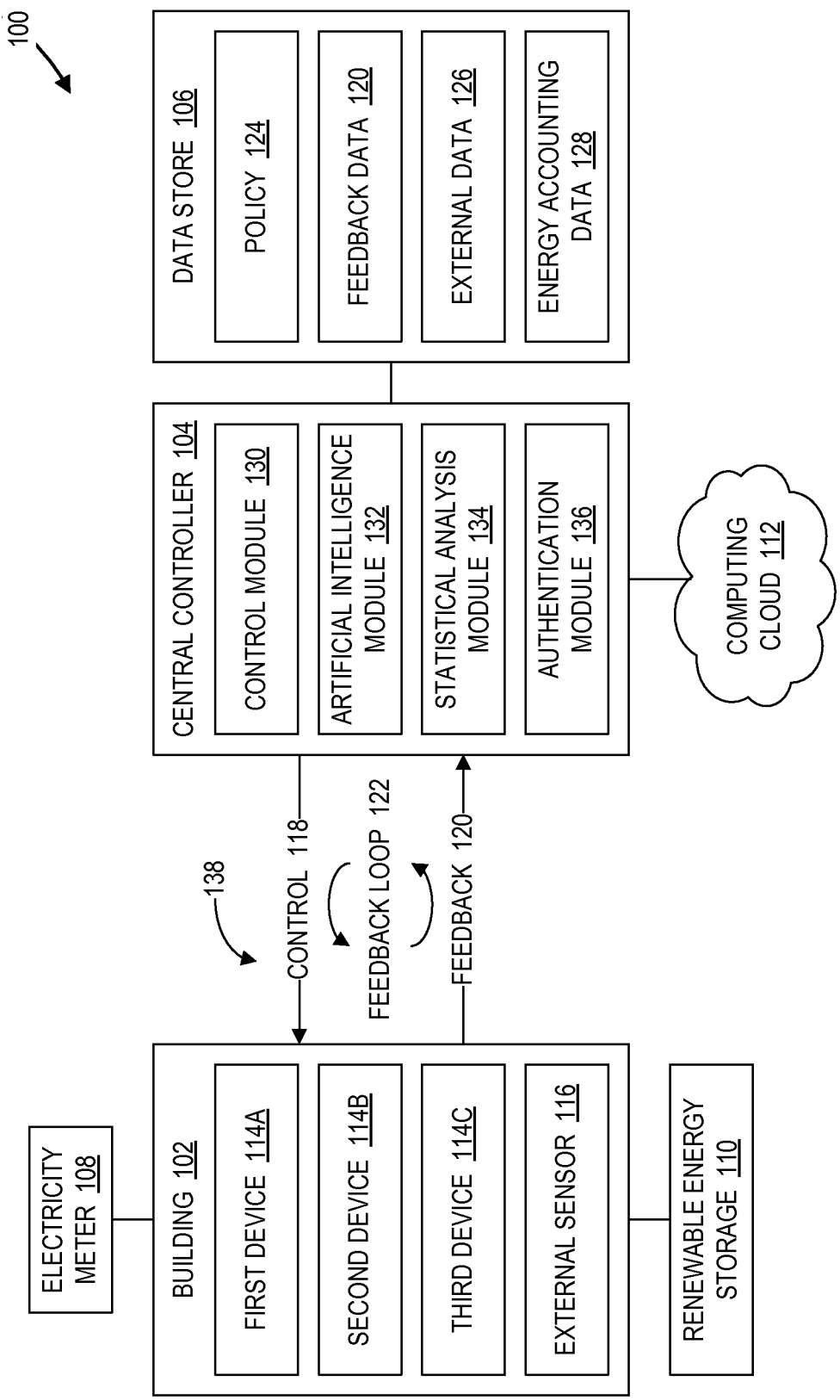
FIG. 1 is a block diagram showing a network architecture capable of implementing an energy management system, in accordance with embodiments.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing an energy management system will be described. In particular, FIG. 1 illustrates a simplified network architecture 100 for providing an energy management system ("EMS"). The architecture 100 may be generically referred to herein as the EMS. The architecture 100 includes a building 102 and a central controller 104 coupled to the building 102 via a network 138, such as the PLC network, a local area network ("LAN"), and the Internet. If a PLC network is implemented as the network 138, the PLC network may include a communication bridge that enables communication via Ethernet, wireless, infrared, and the like. According to embodiments, the network 138 is a restricted, secure network that implements encryption technology. The central controller 104 is further coupled to a data store 106.

The building 102 includes a first device 114A, a second device 114B, and a third device 114C (collectively referred to as devices 114 or generically referred to as a device 114). It should be appreciated that the building 102 may include any number of devices 114. The devices 114 may be any electrical device capable of being controlled by the central controller 104. In illustrative embodiments, the devices 114 include LEDs or SSL technology implemented over a PLC network coupled to the central controller 104.

Embodiments described herein may leverage a PLC network for use with SSL and other solutions, whether known or developed in the future. The PLC network may represent any number of discrete grids or sub-grids, and may be characterized as single-phase, poly-phase (e.g., three-phase delta, three-phase wye, etc.), or the like, depending upon the type and nature of an AC/DC voltage source. In addition, the PLC network may supply and distribute voltage having any number of different voltage classes (e.g., alternating current ("AC"), direct current ("DC"), or any combination of the foregoing). The PLC network may also supply voltage at any appropriate level, depending on the circumstances of particular implementations. The PLC network may represent conductors and devices involved with transmitting and distributing power within at least parts of such installations. The PLC network may also employ phase coupling.

Further, a variety of modulation techniques may be utilized over the PLC network. Examples of such modulation techniques may include, but are not limited to, differential code shift keying ("DCSK"), adaptive code shift keying ("ACSK"), frequency shift keying ("FSK"), orthogonal frequency-division multiplexing ("OFDM"), and the like.

The PLC network may be divided into subnets or segments in which each subnet can be isolated from other subnets as necessary. The PLC network may be segmented using PLC blockers or PLC firewalls in order to prevent network saturation. Thus, for example, if a young child repeatedly flickers a light switch in one segment, the other segments on the PLC network can remain functionally operative.

In other embodiments, the devices 114 may include heaters, water heaters, appliances, heating, ventilation, and air conditioning ("HVAC") units, and the like. The devices 114 further include one or more external sensors 116. The external sensors 116 may include sensors capable of detecting external factors within the building 102. Examples of external sensors 116 include, but are not limited to, sensors for detecting and/or measuring temperature, light level, humidity, gas, pressure, motion, smoke, sound, and occupancy.

The building 102 is further coupled to an electricity meter 108 and a renewable energy storage 110. The electricity meter 108 may be any conventional energy meter that is capable of measuring the amount of electricity utilized by the building 102. The renewable energy storage 110 contains energy generated from natural resources, such as sunlight, wind, rain, geothermal heat, and the like. Examples of the renewable energy storage 110 may include, but are not limited to, capacitors, batter banks, super capacitors, ultra capacitors, and the like. As described in greater detail below, the renewable energy contained in the renewable energy storage 110 may be utilized to offset energy costs, sold to the electricity company, and/or utilized to reduce emission allowances.

The central controller 104 may be any suitable processor-based device, such as a server computer. The central controller 104 includes a control module 130, an artificial intelligence ("AI") module 132, a statistical analysis module 134, and an authentication module 136. In some embodiments, the central controller 104 is coupled to a computing cloud 112. The central controller 104 may utilize the computing cloud 112 to perform at least some of the processing that is described herein with respect to the central controller 104. For example, if the architecture 100 is scaled to include multiple buildings 102 over a significant geography, additional processing may be performed by other computing devices, including other controllers, through the computing cloud 112. Further, the computing cloud 112 may enable the central controller 104 to access remote data, such as weather data, customer traffic data, and the like. The data store 106 includes one or more policies 124, feedback data 120, external data 126, and energy accounting data 128. At least a portion of the data in the data store 106, as well as additional data, may be accessed through the computing cloud 112.

According to embodiments, the control module 130 transmits control data 118 to the devices 114. The control data 118 is operative to control the devices 114. In particular, the control data 118 may include commands or instructions operative to direct the devices 114 to perform specified operations. The devices 114 may be controlled in order to reduce energy consumption. The control data 118 may perform a variety of operations, including switching the device on and off and adjusting the amount of voltage. For example, if the devices 114 include LEDs, the control data 118 may switch the LEDs on and off or dim the LEDs.

As described herein, LEDs may be characterized as digital devices, operable in response to output of a power converter to provide a level of lighting or illumination as specified by the control data 118. In example implementations, the power converter may employ any number of different schemes to modulate input power as specified by the control data 118, thereby resulting in a modulated output power supplied to the LEDs. For example, the power converter may employ pulse-width modulation ("PWM"), pulse-shape modulation ("PSM"), pulse-code modulation ("PCM"), bit-angle modulation ("BAM"), parallel pulse code modulation ("PPCM"), or other modulation techniques, whether known or developed in the future.

The control data 118 may be determined, through the central controller 104, based on the policy 124. The policy 124 may include one or more rules dictating the operation of each of the devices 114. In this regard, the control data 118 may include commands or instructions that individually control each of the devices 114 according to the policy 124. For example, the policy 124 may specify certain conditions upon which the devices 114 are switched on and off or the amount of voltage that is adjusted. As described in greater detail below, the AI module 132 may generate and update the policy 124 according to a variety of information, including the feedback data 120, the external data 126, and the energy accounting data 128.

Upon receiving the control data 118, the devices 114 may perform the commands or instructions contained in the control data 118. Thus, the devices 114 may be switched on and off or the amount of voltage may be adjusted according to the control data 118. In addition to performing the control data 118, the devices 114 may transmit the feedback data 120 to the central controller 104, also through the network 138 (e.g., a PLC network). The devices 114 may actively transmit the feedback data 120 to the central controller 104 irrespective of input from the central controller 104. In the alternative, the devices 114 may also transmit the feedback data 120 to the central controller 104 in response to a query from the central controller 104.

If the devices 114 comprise LEDs or other lighting nodes based on SSL technology, the control data 118 routed to the lighting nodes can command the lighting nodes to illuminate or turn off, and may also command the lighting nodes to perform color mixing, to output particular colors of light. For example, the lighting nodes may include SSL elements having red-green-blue ("RGB") color output capabilities, and the control signals may specify particular RGB values for particular lighting nodes. It is noted that white light may be specified in terms of RGB values. Put differently, white light may be specified as "colored" light. In addition, the color mixing functions described herein may be performed with any suitable modulation schemes, including but not limited to the modulation schemes described herein.

As described in greater detail below with respect to FIG. 2, the devices 114 may include one or more device-embedded sensors, which are operative to detect and/or measure a variety of factors occurring at the device level. Examples of such factors include, but are not limited to, energy consumption and thermal output. Each of the devices 114 may include its own device-embedded sensors. Thus, the feedback data 120 may include independent feedback from the first device 114A, the second device 114B, and the third device 114C.

The feedback data 120 may provide important information regarding the operations of the devices 114 as well as whether the control data 118 is successful at reducing energy consumption or reducing thermal output, among other possible goals. To the extent that energy consumption or thermal output has not been reduced, the feedback data 120 may be utilized to determine the specific source of the problem. For example, if the first device 114A is unnecessarily consuming an excess amount of energy, the feedback provided from the device-embedded sensors within the first device 114A will indicate the excess energy consumption. This level of granularity may be contrasted against the electricity meter 108, which is capable of merely providing the energy usage for the entire building 102. A user reading the electricity meter 108 would generically know that energy consumption has increased. However, the user would have no way of determining that the source of the increased energy consumption is at the first device 114A.

Upon receiving the feedback data 120, the central controller 104 may store the feedback data 120 in the data store 106. The central controller 104 may also store the external data 126 in the data store 106. The external data 126 may be retrieved by the external sensors 116 and transmitted over the network 138 to the central controller 104. The external data 126 may also include data from sources other than the external sensors 116. For example, the external data 126 may include power cost schedules, historical data, device information, and non-controllable factors. The device information refers to conditions or relations between the devices. For example, if one LED is switched off, a condition may indicate that certain other LEDs should be switched off as well. The non-controllable factors may include the time of day, date, season, and geography. In the case of a business environment, the external data 126 may further include operating hours, customer traffic data, marketing data, marketing goals, sales statistics, sales goals, and the like.

The statistical analysis module 134 may determine various statistical patterns of the devices 114 based on the feedback data 120. The statistical patterns may indicate various usage patterns regarding which devices are operating, when the devices are operating, and the amount of energy being consumed by the devices. For example, an illustrative usage pattern may indicate that the lights of a retail store are kept on all day. Upon determining the statistical patterns of the devices 114 based on the feedback data 120, the statistical analysis module 134 may provide the statistical patterns to the AI module 132.

In addition to receiving the statistical patterns from the statistical analysis module 134, the AI module 132 may also retrieve the feedback data 120 and the external data 126 from the data store 106. The AI module 132 may then generate and/or update the policy 124 based on the statistical patterns, the feedback data 120, and the external data 126. In particular, the AI module 132 may determine the rules dictating the control of the device 114 based on the information provided by the statistical patterns, the feedback data 120 and the external data 126. In the previous example where the statistical patterns indicate that the lights of a retail store are kept on all day, the external data 126 may indicate that the retail store is only open from 10 AM to 9 PM. In this regard, the AI module 132 may determine rules that switch off or dim the lights when the retail store is closed.

In another example, occupancy sensors within the building 102 may detect when the retail store is full of shoppers. The AI module 132 may utilize the occupancy information provided by the occupancy sensors to determine rules that adjust the lighting of the retail store at times in accordance with when the retail store is full of shoppers. The AI module 132 may be operative to perform predictive analysis based on the statistical patterns, the feedback data 120, and the external data 126.

In some embodiments, the AI module 132 may also generate and/or update the policy 124 based on the energy accounting data 128. The energy accounting data 128 may include the energy allowances and energy credits. The energy allowances may specify the amount of energy that a given user has been allocated. The energy credits may specify credits offsetting limits in the energy allowances. For example, the energy credits may account for the amount of renewable energy in the renewable energy storage 110. The energy accounting data 128 may also include relevant carbon credit data and carbon footprint data.

Once the AI module 132 has generated and/or updated the policy 124, the AI module 132 stores the policy 124 in the data store 106. The central controller 104 may then implement the policy 124. In particular, the control module 130 may generate the control data 118 based on the rules contained in the policy 124. In some embodiments, the control module 130 may periodically transmit the control data 118 to the devices 114 through the network 138 (e.g., a PLC network). In other embodiments, the devices 114 may be coupled to a user interface (not shown in FIG. 1). The user interface may be present within the building 102 or accessed at a remote location. Through the user interface, the control module 130 may offer suggestions to a user based on the policy 124. In the previous example where the statistical patterns indicate that the lights of a retail store are kept on all day, the control module 130 may offer a suggestion to turn off the lights when the retail store is closed. The suggestion may also include potential energy savings and information to aid the user in determining whether to accept the suggestion. Upon receiving the suggestion through the user interface, the user may be prompted to accept or refuse the suggestion. If the suggestion is accepted, then the control data 118 is passed to the devices 114. If the suggestion is refused, then the control data 118 is not passed to the devices 114.

According to the embodiments described herein, the central controller 104 may generate the control data 118 based on the feedback data 120 received from the devices 114. The central controller 104 may then transmit the control data 118 to the devices 114 through the network 138 (e.g., a PLC network). Upon receiving the control data 118 from the central controller 104, the devices 114 may implement the control data in order to manage energy consumption. Device-embedded sensors in the devices 114 may collect the feedback data 120, and the devices 114 may transmit the feedback data 120 to the central controller 104 also through the network 138 (e.g., a PLC network). The continuous cycle of communications including the control data 118 and the feedback data 120 between the central controller 104 and the building 102 over the network 138 (e.g., a PLC network) is referred to herein as a feedback loop 122. The feedback loop 122 enables the architecture 100 to provide control, energy management, load management, and other features described herein.

In some embodiments, the devices 114 may each contain an identification chip (not shown in FIG. 1) that identifies the particular device. As described in greater detail below with respect to FIG. 2, the identification chip may also include configuration data enabling a corresponding device driver to optimally operate the devices 114. When the devices 114 initially attempt to communicate within the network 138, the authentication module 136 may authenticate the devices 114 based on the data provided by the identification chip. The identification chip may serve as a security feature that prevents unauthorized or unlicensed devices from accessing the network 138. The identification chip may also serve as an anti-cloning feature that prevents unauthorized and unlicensed products from being manufactured. Once the devices 114 are authorized, the authentication module 136 may allow the devices 114 and the central controller 104 to communicate with each other over the network 138.

In an illustrative device 114, the Media Access Control ("MAC") address or other suitable identifier may be hard-coded onto identification chips, which are embedded onto the device 114 during manufacturing. The identification chips may utilize 128-bit encryption, for example, to encrypt the identifier. When the device 114 is connected to the network 138, the identifier may be sent to the authentication module 136 for validation. The authentication module 136 may then issue a 128-bit key that allows the device 114 to communicate over the network 138.

Figure 2:
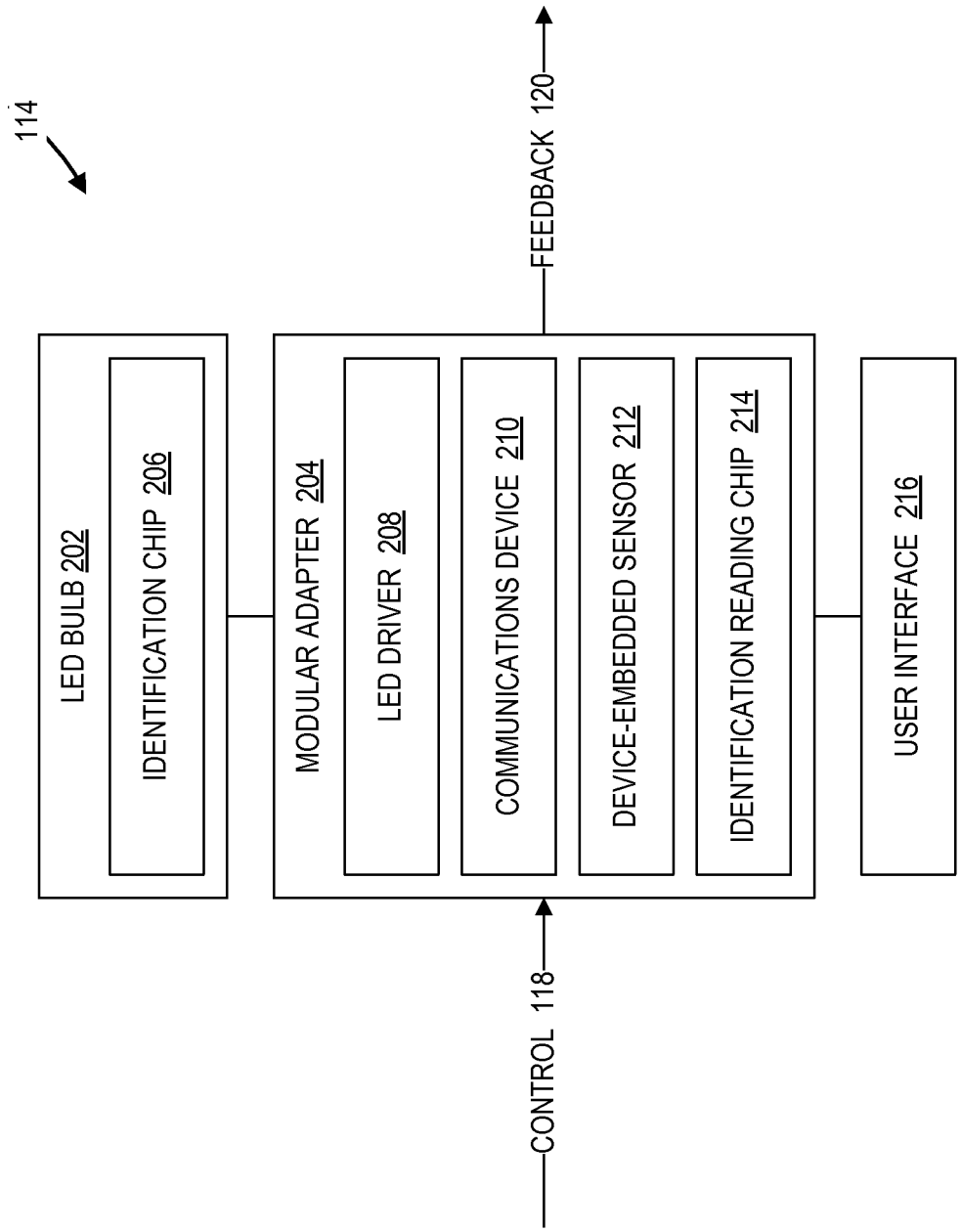
FIG. 2 is a block diagram showing a light emitting diode implemented as a device in the network architecture of FIG. 1, in accordance with embodiments.

Referring now to FIG. 2, a block diagram showing an example implementation of one of the devices 114 is illustrated. In particular, FIG. 2 shows a device 114 implemented as an LED bulb 202. As illustrated in FIG. 2, the device 114 includes the LED bulb 202 and a modular adapter 204. The LED bulb 202 includes an identification chip 206. The modular adapter 204 includes an LED driver 208, a communications device 210, one or more device-embedded sensors 212, and an identification reading chip 214. An illustrative example of the LED bulb 202 is the "illumination device" described in Ser. No. 12/408,463, now U.S. Pat. No. 8,324,838, entitled "ILLUMINATION DEVICE AND FIXTURE," which was incorporated by reference above.

The device 114 further includes a user interface 216. The user interface 216 may be utilized to display suggestions, as previously described, to the user. The user may then choose to accept or reject the suggestions. The user interface 216 may be embodied as hardware, software, firmware, or combinations thereof. The user interface 216 may be a local implementation available at or near the building 102. In the alternative, the user interface 216 may be a remote or handheld implementation located away from the building 102. In this way, the devices 114 can be controlled at remote locations. The communications device 210 enables the LED bulb 202 and the modular adapter 204 to communicate with the central controller 104 over the network 138. The device-embedded sensors 212 may monitor energy consumption or thermal heat and transmit the resulting data to the central controller 104 through the communications device 210.

The identification chip 206 may include an identifier, such as a MAC address, that identifies the LED bulb 202. As previously described, the identifier may be hard-coded into the identification chip 206 and encrypted. The identification chip 206 may then be embedded into the LED bulb 202 during manufacturing, such that the identification chip 206 becomes a fixed and irremovable part of the LED bulb 202. That is, the identification chip 206 may be bonded to the LED bulb 202. The identifier may be verified by the authentication module 136 in order to allow access to the network 138. It should be appreciated that various components shown in the modular adapter 204, such the communications device 210 and the device-embedded sensor 212, may be placed directly within the device 114, the power supply, or other suitable components coupled to the device 114. An illustrative example of identification chip 206 is the "identification circuit" described in Ser. No. 12/408,463, now U.S. Pat. No. 8,324,838, entitled "ILLUMINATION DEVICE AND FIXTURE," which was incorporated by reference above.

The identification chip 206 may also contain configuration data to enable the LED driver 208 to optimally drive the LED bulb 202. For example, the identification chip 206 may include device driver values for driving the LED bulb 202 for optimal brightness. The configuration data may include values for configuring current, modulation frequency, voltage, and heat.

The identification reading chip 214 may be operative to communicate with the identification chip 206. The identification reading chip 214 may communicate with the identification chip 206 to verify that the LED bulb 202 is an authorized and licensed device. For example, the identification reading chip 214 may verify the LED bulb 202 based on the identifier hard-coded on the identification chip 206. If the identification reading chip 214 cannot verify the LED bulb 202 or determines that the LED bulb 202 is an unlicensed device, the modular adapter 204 may send a current spike to the connectors of the LED bulb 202 in order to disable the LED bulb 202.

The identification reading chip 214 may also communicate with the identification chip 206 to read the configuration data. Upon reading the configuration from the identification chip 206, the identification reading chip 214 may adjust the values on the LED driver 208. In this way, the LED driver 208 may drive the LED bulb 202 according to the configuration data on the identification chip 206. Once the authentication module 136 has verified the LED bulb 202, the central controller 104 may also transmit the control data 118 to control the LED bulb 202.

Figure 3:
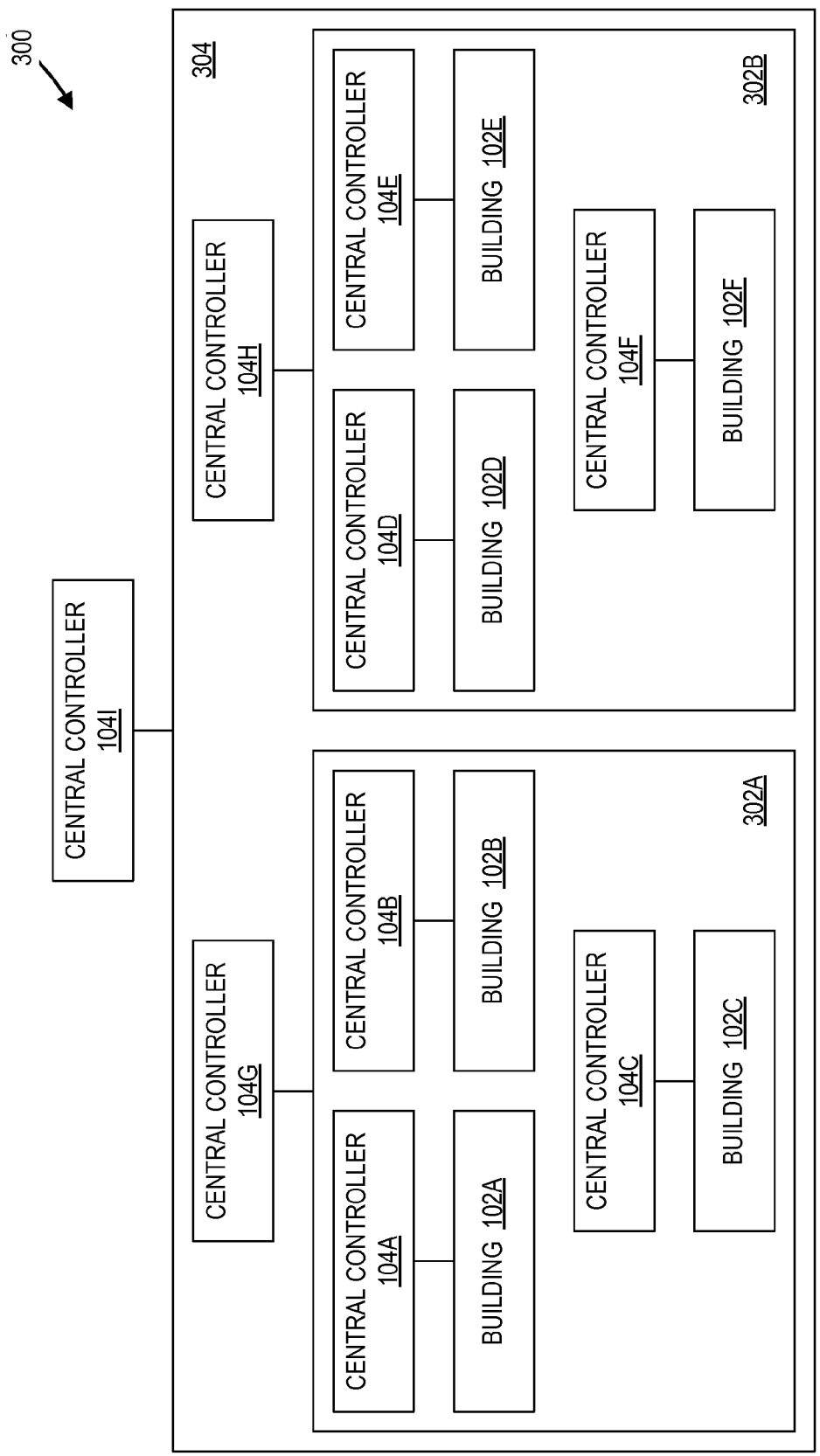
FIG. 3 is a block diagram showing the scalability of the central controller of FIG. 1, in accordance with embodiments.

Referring now to FIG. 3, a block diagram illustrating an expanded implementation of the central controller 104. In particular, FIG. 3 shows the scalability of the central controller 104. Because the devices 114 can communicate over a network, such as the Internet, the central controller 104 can be scaled in order to control additional devices across multiple buildings. In this way, the company can manage energy consumption at various levels of granularity from a single device to an enterprise-wide system.

A first controller 104A, a second controller 104B, and a third controller 104C are coupled to a first building 102A, a second building 102B, and a third building 102C, respectively. A fourth controller 104D, a fifth controller 104E, and a sixth controller 104F are coupled to a fourth building 102D, a fifth building 102E, and a sixth building 102F, respectively. Each of the controllers 104A-104F may control and receive feedback from devices operating in their respective buildings 102A-102F.

The buildings 102A-102C may be grouped as a first regional operation 302A, and the buildings 102D-102F may be grouped as a second regional operation 302B. For example, businesses may sometimes categorize multiple structures in a single entity, such as a region. The buildings 102A-102C in the first regional operation 302A are coupled to a seventh central controller 104G. Further, the buildings 102D-102F in the second regional operation 302B are coupled to an eighth central controller 104H. The seventh central controller 104G and the eighth central controller 104H may control and receive feedback from devices operating in the respective regions 302A-302B.

The first regional operation 302A and the second regional operation 302B may be grouped as an enterprise 304. The buildings 102A-102F in the enterprise 304 are coupled to a ninth central controller 104I. The ninth central controller 104I may control and receive feedback from devices operating in the enterprise 304.

Figure 4:
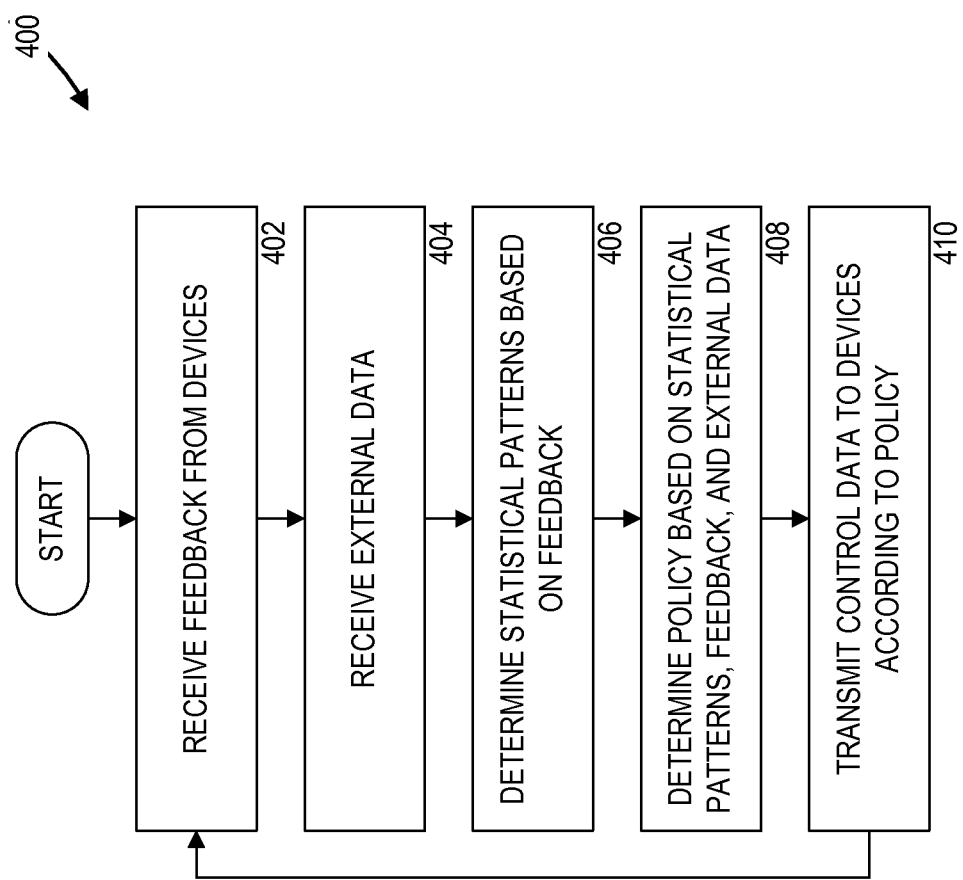
FIG. 4 is a flow diagram showing a method for controlling energy consumption across multiple devices, in accordance with embodiments.
Figure 5:
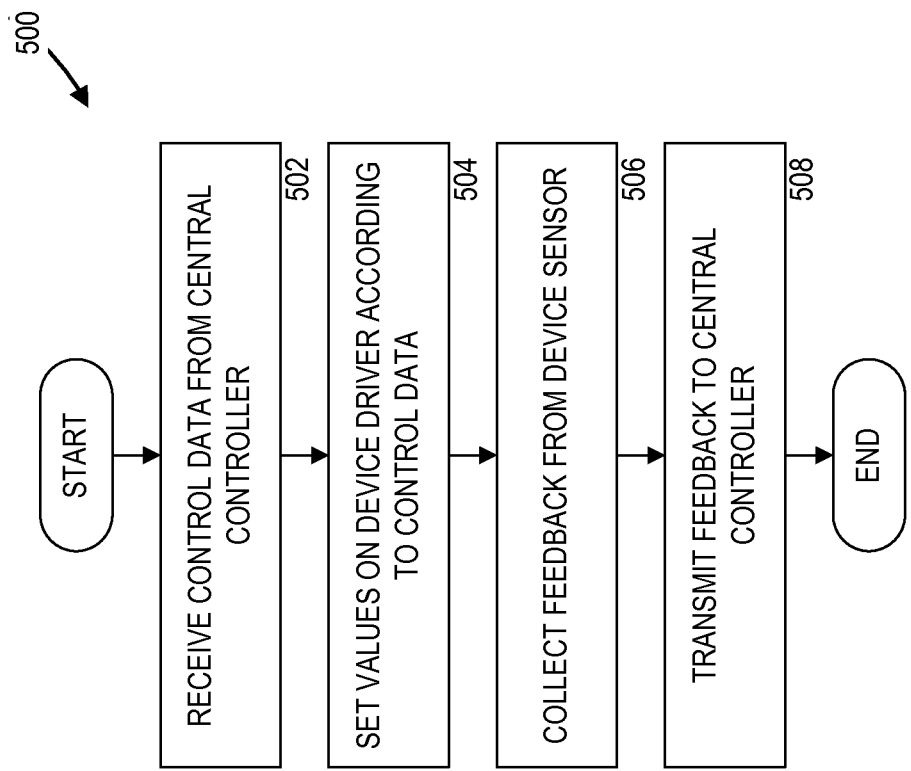
FIG. 5 is a flow diagram showing a method for providing energy-related feedback to a central controller, in accordance with embodiments.

Referring now to FIGS. 4-5, additional details will be provided regarding the embodiments presented herein for the energy management system. In particular, FIG. 4 is a flow diagram illustrating a method for controlling energy consumption across multiple devices from the perspective of the central controller 104. FIG. 5 is a flow diagram illustrating a method for providing energy-related feedback to a central controller.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where the central controller 104 receives the feedback data 120 from the devices 114. The devices 114 may actively transmit the feedback data 120 to the central controller 104 irrespective of input from the central controller 104. In the alternative, the devices 114 may also transmit the feedback data 120 to the central controller 104 in response to a query from the central controller 104. The feedback data 120 may be generated by device-embedded sensors, such as the device-embedded sensor 212. Examples of the feedback data 120 include, but are not limited to, energy consumption and thermal output. By embedding the sensors into the device, the sensors can provide device-level feedback (e.g., the amount of energy consumed by a specific device) to the central controller 104. The routine 400 then proceeds to operation 404.

At operation 404, the central controller 104 also receives external data 126. The external data 126 may be retrieved by the external sensors 116. Examples of external sensors 116 include, but are not limited to, sensors for detecting and/or measuring temperature, light level, humidity, gas, pressure, motion, smoke, sound, and occupancy. The external data 126 may also include data from sources other than the external sensors 116. For example, the external data 126 may include power cost schedules, historical data, device information, and non-controllable factors, such as the time of day, season, and geography. The device information may refer to conditions between the devices. In the case of a business environment, the external data 126 may further include operating hours, customer traffic data, marketing data, marketing goals, sales statistics, sales goals, and the like. The external data 126 may also include data from other devices. The routine 400 then proceeds to operation 406.

At operation 406, the statistical analysis module 134 determines statistical patterns by analyzing the feedback. One example of a statistical pattern is a usage pattern, which may show patterns indicating which devices are operating, when the devices are operating, and the amount of energy being consumed by the devices. The statistical analysis module 134 may utilize any of a variety of technologies, such as statistical analysis, predictive analysis, data mining, and the like. Upon determining the statistical patterns, the statistical analysis module 134 may provide the statistical patterns to the AI module 132. The routine 400 then proceeds to operation 408.

At operation 408, the AI module 132 generates and/or updates the policy 124 based on the statistical patterns, the feedback data 120, and the external data 126. The AI module 132 may utilize any of a variety of technologies, such as probabilistic models, neural networks, machine learning, and the like. Through analyzing the statistical patterns, the feedback data 120, and the external data 126, the AI module 132 can generate the rules contained in the policy 124. In particular, the AI module 132 may generate rules that optimally manage energy usage in light of the statistical patterns, the feedback data 120, and the external data 126. Upon generating and/or updating the AI module 132, the AI module 132 may store the policy 124 in the data store 106. The routine 400 then proceeds to operation 410.

At operation 410, the control module 130 generates the control data 118 based on the policy 124 and transmits the control data 118 to the devices 114 through the network 138. The control data 118 may include commands that control each of the devices 114 individually according to the policy 124. Once the control module 130 transmits the control data 118 to the devices 114, the routine 400 may return to the operation 402 where the central controller 104 receives the feedback data 120 from the devices 114. The continuous transmission of the control data 118 and the feedback data 120 between the central controller 104 and the devices 114 forms the feedback loop 122.

In FIG. 5, a routine 500 begins at operation 502, where a device 114 receives the control data 118 from the central controller 104. For example, the modular adapter 204 may receive the control data 118. The control data 118 may include values for setting a device driver, such as the LED driver 208. The routine 500 then proceeds to operation 504, where modular adapter 204 sets the values of the LED driver 208 according to the control data 118. In this case, the values may switch on or off or dim the LED bulb 202. The LED driver 208 operates LED bulb 202 according to the newly set values. The routine 500 then proceeds to operation 506.

At operation 506, the device-embedded sensor 212 collects the feedback data 120. Examples of the feedback data 120 include, but are not limited to, energy consumption and thermal output. The routine 500 then proceeds to operation 508, where the device 114 transmits the feedback data 120 to the central controller 104. The device 114 may actively transmit the feedback data 120 to the central controller 104 irrespective of input from the central controller 104. In the alternative, the device 114 may transmit the feedback data 120 the central controller in response to a query from the central controller 104.

Described below are five illustrative EMS scenarios and their respective solutions. Unlike conventional energy management techniques, the network architecture 100 as previously described is capable of implementing these solutions. The first scenario is a retail scenario, and the second scenario is a residential scenario. The third scenario is an industrial scenario, and the fourth scenario involves hospitality and multi-family dwellings. The fifth scenario involves commercial buildings. These scenarios illustrate the scalability of network architecture 100. It should be appreciated that these examples are not intended to be limiting or mutually exclusive. For example, certain scenarios and solutions may be applicable to both residential and retail environments.

1. Retail Example

The EMS can be used in a retail environment for monitoring energy consumption and reducing energy overhead. The EMS may also be used as a product sales tool. Consider a drug store, for example. In this example, the drug store is a new construction. The owners of the drug store have decided to incorporate EMS throughout the drug store including in overhead lights, shelve lights, light sensors, motion sensors throughout the main floor space, beam relays on the main entrance, and solar panels on the roof. The store operates twenty-four hours a day with a skeleton crew at night. Also, the store is closed most major holidays and is located in an area with good solar saturation.

Below are some examples of logic that the EMS system can employ. During the day, the EMS may utilize the external sensors 116 (e.g., motion sensors) to monitor and track the number of people entering and exiting the store, as well as which areas of the store were most visited by patrons. The EMS may also monitor the cost of utilities throughout the day. The EMS may also ensure that renewable energy from solar panels is used during peak cost hours. The EMS may also determine that the benefits are not in the use of the renewable energy, but rather in selling the renewable energy back to the utility company by putting the power back on the grid.

In an illustrative example, the manager may be running a special on hair spray, which is located at the hair spray shelf. Thus, the manager may access the EMS, through the user interface 216, to control the lights on the shelves located in the middle of the store. For example, the manager may increase lighting of the hairspray shelf by ten percent while dimming the surrounding shelves by ten percent. In this way, the manager can draw attention to the hairspray shelf. The EMS may also include light sensors placed throughout the store to measure ambient light and to maintain a pre-determined light level by adjusting the electrical lighting. In this way, the EMS can harvest the available sunlight to supplement the illumination system.

In further embodiments, the central controller 104 may access weather data and other information either natively or through the computing cloud 112. The EMS may adjust solar usage, HVAC usage, and lighting usage to account for cloud cover, increases in temperature, and available sunlight. Also, by monitoring the business holidays, the EMS may also begin decreasing the amount of energy used by the HVAC leading up to consecutive non-business days. During the off days, the EMS may continue in an energy saving mode. Then on the eve of the next business day, the EMS may return the amount of energy used by the HVAC back to standard levels.

Through the user interface 216, a suggestion may be prompted to the store manager with respect to a store room in the drug store. In particular, the EMS may determine that the store room lights are consistently left on, although store room is unoccupied eighty percent of the time. In this case, the EMS may suggest a rule to turn the lights off when there is no motion and a rule to turn the lights off after twenty minutes of use. The manager may then accept one of the two rules or reject both rules.

2. Residential Example

In a typical residential setting, the EMS can be used to decrease energy consumption in a number of ways. Due to the compartmentalized nature of most residential homes, the EMS can find wasted energy consumption throughout a residential dwelling. For example, lights in utility areas may be a significant source of wasted energy consumption. The EMS can identify closet lights that are left on, doors that are left open causing strain on HVAC systems, and appliances (e.g., washers/dryers, water heaters, etc.) that are using more than standard or ideal energy levels.

In one potential usage scenario, the EMS may be used to track when the home is occupied or unoccupied and to make adjustments accordingly. The EMS-enabled water heaters may monitor peak usage over a given period of time to establish a pattern. For example, the EMS may recognize that hot water is typically requested between the hours of 7 am-9 am and then again at 10 pm. During off-peak times, the EMS may adjust the heater to consume less energy. The EMS may also anticipate peak hours and adjust the heater back to normal levels during those times.

As previously stated, the EMS may also have access to weather data. In particular, the EMS may delay or change certain actions based on predicted weather conditions. In one example, if rain is predicted, the EMS may terminate or delay a scheduled watering of the lawn. In another example, if the outside temperature is predicted to drop more than fifteen degrees, the EMS may adjust HVAC settings to account for the change in temperature.

3. Industrial Example

While the previous scenarios described above may be applicable to multiple settings, some environments offer unique opportunities for large amounts of energy recovery. For example, industrial settings often have a poor public perception with regards to energy conservation. Large machines may be left idol while waiting for operators. Cutting power during idol time of even just a relatively small number of large machines can save a significant amount of power. The EMS may identify which machines are consuming more power than is required to fulfill their function. For example, a break press machine that is on all day may be used only once or twice a week. Upon identifying the break press machine, the EMS may enact policies that directly address the amount of wasted energy by shutting power to the break press machine at appropriate times.

Because the EMS works in multiple voltage classes and across multiple power phases, the EMS is capable of handling industrial environments. Further, because EMS is monitoring power consumption at the device or at the power connection point, energy consumption monitoring and data is available to a wide range of products. In one example, conveyor belts may be shut down when the EMS is aware that there are no products to be moved. In another example, high-bay lights may be dimmed when light sensors detect that an ample supply of sunlight is available from skylights.

4. Hospitality and Multi-Family Dwelling

Hotels and apartment complexes can benefit from property-wide energy accounting as well. For example, the EMS can manage common lighting areas to reduce the amount of energy utilized in unoccupied areas, such as halls, hotel rooms, meeting areas, and common dining rooms. When a tenant occupies a given room, the property manager typically has no way to monitoring the tenant's energy usage inside the room. The EMS enables the property manager to monitor and resolve any wasted energy consumption by the tenant.

In an illustrative example, the EMS may inform the property manager that room #212 is consuming 180% more power than collected historical data for that room. The EMS may further inform the property manager that the increase in energy consumption results from the HVAC having been running at 100% for more than three hours. The EMS can report that the room is occupied and that a window has been left open. The EMS can then present the manager, through the user interface 216, with an option to decrease HVAC performance when a window has been detected as being open and when the HVAC is in operation. The user interface 216 may be configured with a simple dialogue and user-friendly prompts such that no advance programming knowledge is required or necessary.

5. Commercial Buildings

As used herein, daylight harvesting is a term used to describe a system that maintains constant lighting levels based on available natural light. In commercial buildings, the EMS can be used for this purpose by decreasing overhead light levels when natural sunlight has been measured and is deemed an effective supplement to electrical light. In further energy recovery techniques, the EMS may make suggestions to the user based on building occupancy and predicted use.

One significant factor in an effective large scale deployment is the storage of power. With a low voltage general illumination system such as LED, power can be stored in battery banks when power costs are low, and utilized when power costs are high. This technique can also be applied to renewable energy sources such as solar and roof-mounted wind power generators. Further, because EMS controls load on the device level, granular control of cubical power can be associated with building security. For example, if an employee is not logged as being onsite, the power utilized at the employee's cubicle can be toggled, and lights used to illuminate an employee's section can be turned off.

Figure 6:
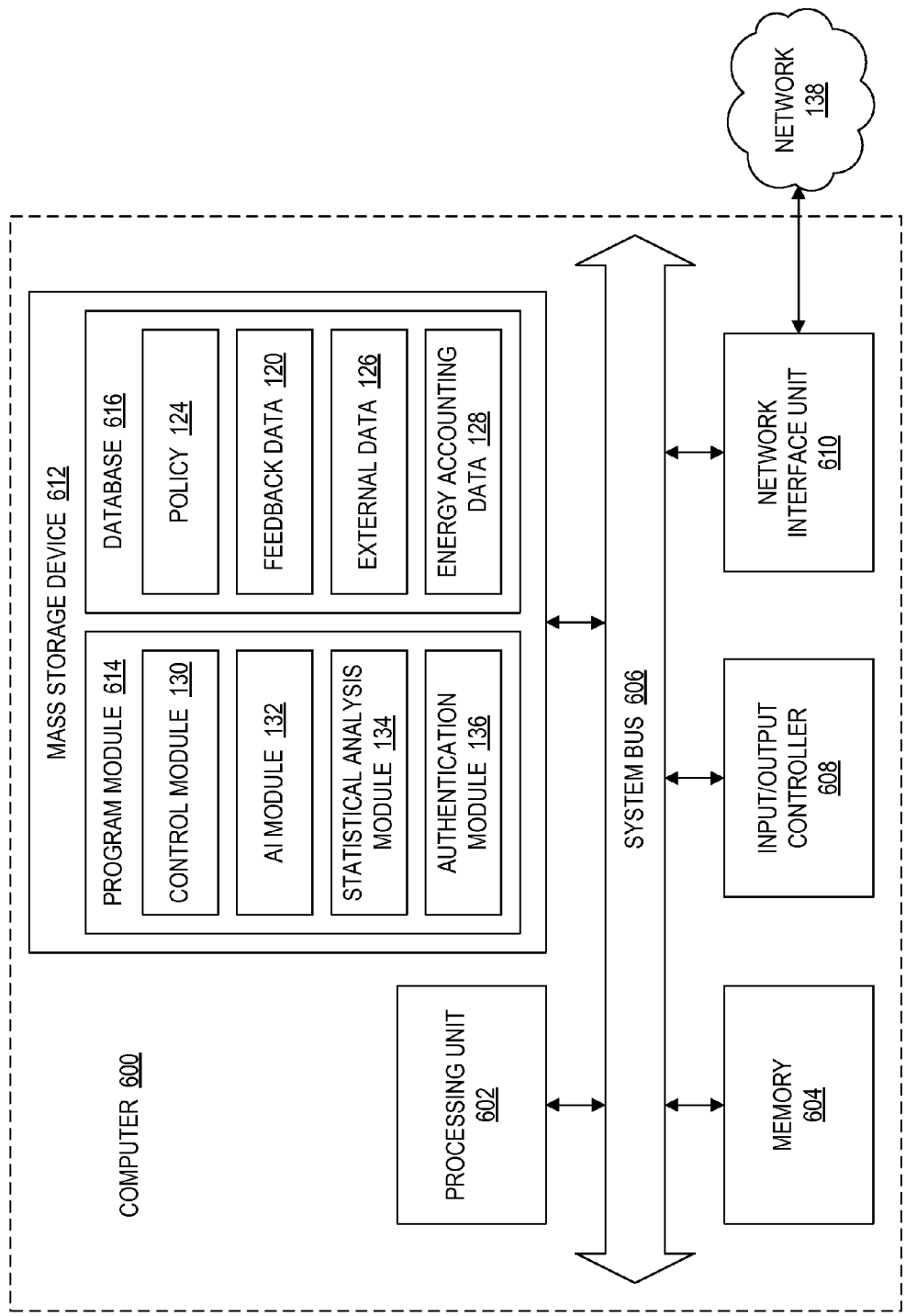
FIG. 6 is a computer architecture diagram showing aspects of an illustrative computer hardware architecture for a computing system capable of implementing the embodiments presented herein.

Referring now to FIG. 6, an exemplary computer architecture diagram showing aspects of a computer 600 is illustrated. Examples of the computer 600 may include central controller 104 as well as computing devices within the computing cloud 112. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 include the control module 130, the AI module 132, the statistical analysis module 134, and the authentication module 136. An example of the databases 616 is the data store 106. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network, such as the network 138. The computer 600 may connect to the network 138 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for providing an energy management system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A processor-implemented method for controlling energy consumption across a plurality of devices, the processor-implemented method comprising processor-implemented operations for:
   receiving feedback data from the plurality of devices comprising energy consumption data associated with the operation of at least one of the plurality of devices;
   receiving external data comprising device-independent data from an external sensor;
   determining statistical patterns of the plurality of devices based at least in part on the feedback data;
   determining a policy to reduce excess energy consumption based on the statistical patterns, and the external data, the policy comprising a set of rules dictating the operation of each of the plurality of devices and reducing energy consumption at the plurality of devices;
   providing a suggestion comprising the determined policy and an option whether to accept or reject the suggestion through a user interface;
   upon providing the suggestion and the option through the user interface, receiving a response to accept the suggestion; and
   upon receiving the response to accept the suggestion, transmitting control data based on the policy to the plurality of devices, the control data operative to transform the operation of the plurality of devices according to the set of rules to reduce excess energy consumption.

2. The processor-implemented method of claim 1, wherein the plurality of devices comprise light emitting diodes.

3. The processor-implemented method of claim 1, wherein the set of rules dictating the operation of each of the plurality of devices and reducing energy consumption at the plurality of devices comprises a set of rules dictating whether each of the plurality of devices is switched on, switched off, or dimmed.

4. The processor-implemented method of claim 1, wherein the plurality devices are implemented over a power line carrier (PLC) network.

5. The processor-implemented method of claim 1, wherein the feedback data comprises feedback data from a device-embedded sensor; and wherein the feedback data from the device-embedded sensor further comprises thermal output data.

6. The processor-implemented method of claim 1, wherein the device-independent data from the external sensor comprises data of at least one of temperature, light level, humidity, gas, pressure, motion, smoke, sound, or occupancy.

7. The processor-implemented method of claim 1, wherein the external data comprises at least one of historical usage data, power cost schedule, non-controllable factors, device information, and carbon credit data.

8. The processor-implemented method of claim 7, wherein the non-controllable factors comprise time of day, date, season, and geography.

9. The processor-implemented method of claim 7, wherein the carbon credit data comprises a carbon credit policy specifying a carbon emissions limit above which a penalty is enforced and a carbon footprint.

10. A non-transitory computer-readable medium having computer-executable instructions stored thereupon which, when executed by a computer, cause the computer to:
    receive feedback data from a plurality of light emitting diode (LED) based lighting devices associated with a location in a retail store, wherein the feedback data includes sensor information and operating information associated with the LED based lighting devices;
    receive external data, wherein the external data relates to a product offered for sale in the retail store illuminated by the LED based lighting devices;
    determine statistical patterns of the plurality of devices based at least in part on the feedback;
    determine a policy to increase sales of the product associated with the location based at least in part on the statistical patterns and the external data, the policy comprising a set of rules dictating the operation of the plurality of LED based lighting devices;
    provide a suggestion comprising the determined policy, wherein the determined policy includes an amount of increase of lighting in the location or an amount of reduction of lighting adjacent the location, and an option whether to accept or reject the suggestion through a user interface;
    upon providing the suggestion and the option through the user interface, receive a response to accept the suggestion; and
    upon receiving the response to accept the suggestion, transmit control data based on the policy to the plurality of LED based lighting devices, the control data operative to transform the operation of the plurality of devices according to the set of rules.

11. The computer-readable medium of claim 10, wherein the plurality of devices comprise light emitting diodes.

12. The computer-readable medium of claim 11, wherein the set of rules dictating the operation of each of the plurality of devices and reducing energy consumption at the plurality of devices comprises a set of rules dictating whether each of the plurality of devices is switched on, switched off, or dimmed.

13. The computer-readable medium of claim 12, wherein the plurality devices are implemented over a power line carrier (PLC) network.

14. The computer-readable medium of claim 13, wherein the feedback data comprises feedback data from a device-embedded sensor, and wherein the feedback data from the device-embedded sensor comprises at least one of energy consumption data or thermal output data.

15. The computer-readable medium of claim 14, wherein the external data comprises device-independent data from an external sensor, and wherein the device-independent data from the external sensor comprises data of at least one of temperature, light level, humidity, gas, pressure, motion, smoke, sound, or occupancy.

16. An apparatus for controlling energy consumption across a plurality of devices, the apparatus comprising:
    a processor; and a computer-readable medium storing instructions which, when executed on the processor, cause the processor to
receive feedback data from a plurality of devices,
receive external data comprising device-independent data from an external sensor,
determine statistical patterns of the plurality of devices based on the feedback data to reduce an amount of wasted energy consumption,
determine a policy to reduce excess energy consumption based on the statistical patterns, and the external data, the policy comprising a set of rules dictating the operation of each of the plurality of devices and reducing energy consumption at the plurality of devices,
provide a suggestion comprising the determined policy and an option whether to accept or reject the suggestion through a user interface,
upon providing the suggestion and the option through the user interface, receive a response to accept the suggestion, and
upon receiving the response to accept the suggestion, transmit control data based on the policy to the plurality of devices, the control data operative to transform the operation of the plurality of devices according to the set of rules.

17. The apparatus of claim 16, wherein the plurality of devices comprise light emitting diodes.

18. The apparatus of claim 17, wherein the set of rules dictating the operation of each of the plurality of devices and reducing energy consumption at the plurality of devices comprises a set of rules dictating whether each of the plurality of devices is switched on, switched off, or dimmed.

19. The apparatus of claim 18, wherein the plurality devices are implemented over a power line carrier (PLC) network.

20. The apparatus of claim 19, wherein the feedback data comprises feedback data from a device-embedded sensor, and wherein the feedback data from the device-embedded sensor comprises at least one of energy consumption or thermal output.

* * * * *